No. 758,821. PATENTED MAY 3, 1904.
W. A. CLARK.
BUSHING FOR PULLEYS.
APPLICATION FILED OCT. 19, 1900.
NO MODEL.

Witnesses.
Thomas C. Drummond.
Edward H. Allen.

Inventor.
William A. Clark,
by Crosby & Gregory
atty's.

THE NORRIS PETERS CO., PHOTO-LITHO., WASHINGTON, D. C.

No. 758,821.

Patented May 3, 1904.

UNITED STATES PATENT OFFICE.

WILLIAM A. CLARK, OF BOSTON, MASSACHUSETTS.

BUSHING FOR PULLEYS.

SPECIFICATION forming part of Letters Patent No. 758,821, dated May 3, 1904.

Application filed October 19, 1900. Serial No. 33,624. (No model.)

*To all whom it may concern:*

Be it known that I, WILLIAM A. CLARK, a citizen of the United States, residing at Boston, county of Suffolk, State of Massachusetts, have invented an Improvement in Bushings for Pulleys, of which the following description, in connection with the accompanying drawings, is a specification, like letters on the drawings representing like parts.

This invention has for its object the production of a strong, durable, and effective bushing for pulleys particularly adapted for use with clutch-pulleys, the driven member of the pulley being mounted upon the bushing, so as to be normally rotatable relatively to the shaft.

The various novel features of my invention will be fully described in the specification, and particularly pointed out in the following claims.

Figure 1:
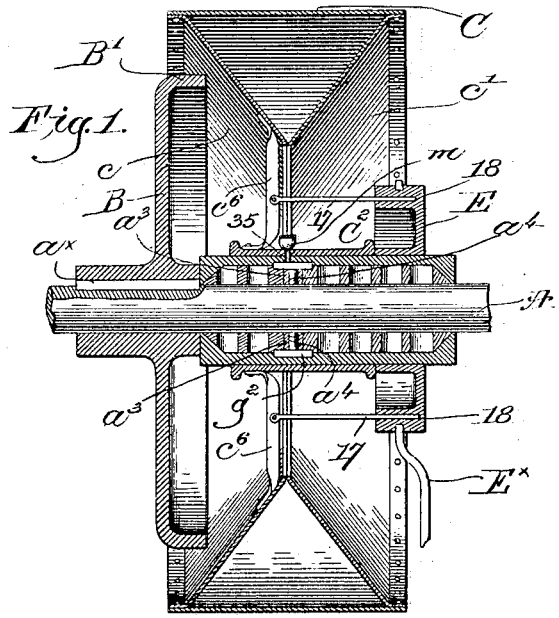
Figure 2:
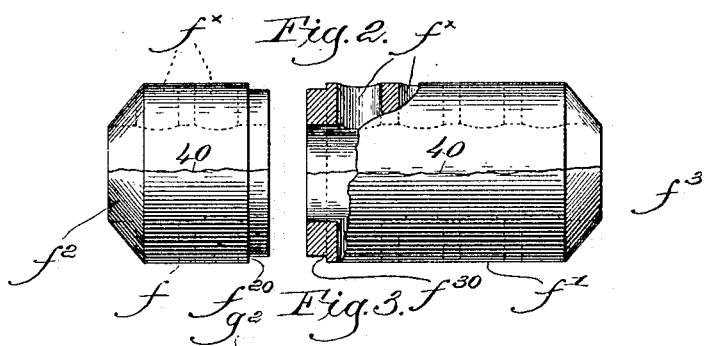
Figure 3:
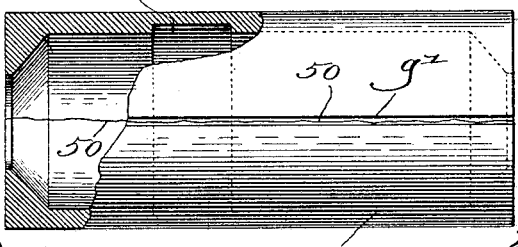
Figure 4:
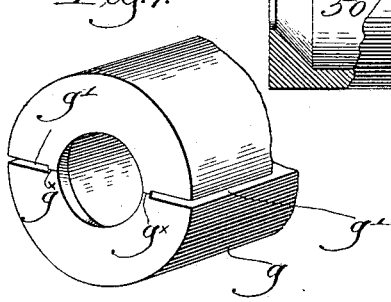
Figure 5:
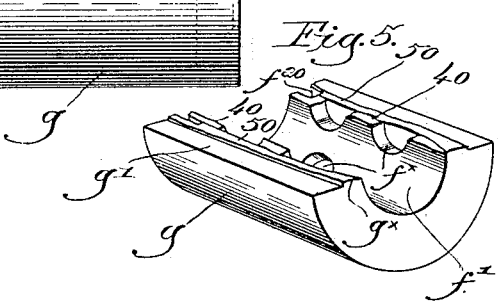

Figure 1 is a longitudinal sectional view of a pulley-bushing embodying my invention shown in connection with a clutch-pulley, the means for clutching the driving and driven members being omitted, however, as forming no part of this invention. Fig. 2 is an enlarged side elevation and partial section of the two-part internal member of the bushing. Fig. 3 is a side elevation and partial section of the external member of the bushing. Fig. 4 is a perspective detail of one end of the bushing; and Fig. 5 is a similar detail showing the interior of the bushing, the internal and external members thereof being assembled.

In Fig. 1 I have shown the loose or driven member of the clutch-pulley of a construction similar to that shown and described in United States Patent No. 656,944, granted to me August 28, 1900, and the loose or driven member of the pulley is mounted on a novel self-lubricating bushing adapted to contain a large supply of lubricant, the bushing being readily adapted for application to or removal from a clutch without necessitating any temporary derangement of the latter.

Referring to Fig. 1, the shaft A has rigidly secured to it by a suitable key $a^\times$ the hub of the driving member B, which may be a split disk, and having an inturned annular flange B' to coöperate with suitable means carried by the other or driven member of the pulley, such means not being shown herein, to clutch the two members of the pulley together when desired.

The driven member consists, substantially, of a sheet-metal face C and provided with a hub $C^2$ to embrace the bushing, to be hereinafter described, and the hub $C^2$ may be split, if desired, in any suitable manner for ready application to the shaft—as, for instance, in my patent hereinbefore referred to.

The face C is provided with webs $c$ $c'$, secured at their outer edges to the face C and brought together toward the center of the pulley and connected, as by rivets, to form a V-shaped box-web. The hub $C^2$ is connected with the web in any suitable manner, as by strap-like arms $c^6$.

A collar E, rotatable relatively to the shaft A, is slidably mounted on the bushing and is actuated by means of a suitable yoke $E^\times$ to clutch or unclutch the pulley in well-known manner.

To prevent any twisting between the actuator E and the driven member of the pulley, guide-pins 17, Fig. 1, parallel to the shaft, are mounted on the arms $c^6$ and extend through holes 18 in the actuator near its periphery, as clearly shown in Fig. 1, the pins taking up any twisting strain and effecting the rotating movement of the actuator and driven member always in unison.

The bushing on which the driven member of the pulley is mounted is so constructed that it is not only self-lubricating, but it will also retain the lubricant without necessitating careful and extensive packing.

The bushing comprises inner and outer concentric members, the former rotatable relatively to the shaft and to the outer member, while the latter is secured to and to rotate with the hub of the driven member. The inner or sleeve-like member is made as a cylindrical casting having a central bore of a diameter to receive with a running fit the shaft to which it is to be applied and having beveled ends, the sleeve being provided with a series of radial perforations $f^\times$. The casting forming the sleeve is severed longitudinally into two parts by breaking, to thus get irregular edges, as 40, Figs. 2 and 5, which irregular edges of course will exactly fit the opposed edges of the break on the other piece. Not only this, but the sleeve is sawed apart transversely to form two parts $f$ $f'$, respectively, the inner ends of which are reduced in diameter to leave annular shoulders, as $f^{20}$ $f^{30}$, respectively, the outer end of the part $f$ being beveled at $f^2$, while the outer end of the part $f'$ is similarly beveled, as at $f^3$, as clearly shown in Fig. 2. When the two parts $f$ $f'$ of the inner member or sleeve are applied to the shaft, their inner ends abut against a collar $a^3$, secured to the shaft by one or more set-screws, as $a^4$, Fig. 1, and the shoulder portions $f^{20}$ $f^{30}$ of the parts $f$ and $f'$ thus leave an annular recess about the exterior of the sleeve, the external diameter of the collar being substantially equal to the diameter of the reduced inner ends of the parts $f$ $f'$, as shown in Fig. 1.

The outer member of the bushing is made as a cylindrical casting $g$, and it is chambered out or recessed internally to just snugly fit the sleeve $f$ $f'$ when the latter is in place on the shaft, as shown in Fig. 1 and partially in Fig. 5, the ends of the outer member $g$ overlapping the beveled ends of the inner member or sleeve. Manifestly the outer member thereby acts as a binder to prevent longitudinal or lateral separation of the parts $f$ $f'$ of the inner sleeve, maintaining the longitudinal division edges of the inner member in firm contact with each other, and inasmuch as the collar $a^3$ is fast to the shaft A it will be manifest that the bushing as a whole cannot move longitudinally relatively to the shaft. I have shown the outer member $g$ as slotted or sawed longitudinally from end to end, as at $g'$, Figs. 3, 4, and 5, and the saw cuts or slots are diametrically opposite each other and extend inwardly from the external surface toward the bore of the member $g$, leaving a thin fin, as $g^\times$, Figs. 4 and 5. The sleeve is then split apart through this fin, thereby giving an irregular line of fracture, as 50; but it divides the member $g$ longitudinally into two parts, so that it can be applied to a shaft and to the inner member $f$ $f'$, as desired. The irregular edges of the fracture will closely unite—so closely as to practically prevent the escape of lubricant; but, if desired, I may insert packing of any suitable character in the slot $g'$ when the two parts of the member $g$ are in place. The member $g$ has an interior annular channel $g^2$, which communicates by a hole 35, Fig. 1, with a suitable oil-cup $m$, carried by the hub $C^2$ of the pulley, the oil passing into the interior of the bushing by the channel $g^2$, and it is distributed from the latter to the adjacent concentric surfaces of the inner and outer members of the bushing, the perforations $f^\times$ permitting the lubricant to come into contact with the shaft A and lubricate the latter.

When the parts of the bushing are assembled, the recess $g^2$ practically registers with the annular recess formed by the reduced inner ends of the parts $f$ $f'$ of the sleeve.

The hub $C^2$ of the driven member is clamped securely upon the outer member of the bushing, so that the latter will at all times move with the driven member, the said outer member being rotatable on the inner sleeve $f$ $f'$, while the latter in turn is rotatable on the shaft.

Obviously the bushing herein described may be used with a loose pulley of any other suitable construction, as it will be manifest that it is not restricted solely to a pulley of the construction herein shown and described.

Having described my invention, what I claim as new, and desire to secure by Letters Patent, is—

1. A rotatable shaft, a pulley having a hub, and a lubricating-bushing interposed between the shaft and hub, and comprising concentric inner and outer, longitudinally-divided members, the former being rotatable on the shaft and within the outer member, said latter member being secured to the hub, and means to prevent longitudinal movement of the bushing on the shaft.

2. A rotatable shaft, a pulley having a hub, and a lubricating-bushing interposed between the shaft and hub, said bushing comprising an inner, longitudinally-divided sleeve rotatable on the shaft, an outer member, also longitudinally divided and at its ends overlapping the sleeve, said outer member being secured to the hub, and means to prevent longitudinal movement of the sleeve on the shaft.

3. A rotatable shaft, a pulley having a hub, and a self-lubricating bushing between the hub and shaft, said bushing comprising a perforated sleeve rotatable on the shaft and held from longitudinal movement, and a concentric sleeve having an internal oil-reservoir communicating with the perforated sleeve, said outer sleeve overlapping the ends of the inner sleeve, the outer sleeve being rigidly secured to the hub, to rotate therewith.

4. A rotatable shaft, a pulley thereon having a hub, a longitudinally-separable bushing fixedly held therein and interiorly recessed, a separable sleeve interposed between the shaft and bushing and seated in the recess of the latter, said sleeve being rotatable relatively to the shaft and bushing, means to prevent longitudinal movement of the sleeve on the shaft, and lubricating means for the bushing and sleeve.

5. A self-lubricating bushing for loose pulleys, comprising a longitudinally-separable, perforated inner member having beveled ends, and a concentric, longitudinally-separable outer member internally recessed to receive the inner member and embrace its beveled ends, and having an internal oil-channel.

6. A self-lubricating bushing for loose pulleys, comprising a perforated sleeve irregularly divided longitudinally and having reduced ends, and a concentric bushing also divided irregularly in the direction of its length and internally recessed to snugly embrace the sleeve, said bushing having an internal oil-channel and external longitudinal packing-seats.

7. A self-lubricating bushing for loose pulleys, comprising a perforated sleeve irregularly divided longitudinally and having reduced ends, and a concentric cylindrical bushing internally recessed to snugly receive the sleeve, said bushing having opposite longitudinal slots extended inwardly from its periphery to leave a thin wall through which the bushing is irregularly separated, the bushing having an internal oil-channel.

8. In apparatus of the class described, a rotatable shaft, a loose pulley thereon, a lubricating-bushing between the pulley and shaft, comprising an inner sleeve transversely separated and each part longitudinally divided, and adapted to loosely surround the shaft, and an outer, longitudinally-divided sleeve having its ends overlapping the ends of the inner sleeve, the outer sleeve being rigidly attached to the pulley, combined with a collar fast on the shaft between the transversely-separated parts of the inner sleeve, acting in conjunction with the outer sleeve to prevent longitudinal movement of the bushing as a whole.

In testimony whereof I have signed my name to this specification in the presence of two subscribing witnesses.

WILLIAM A. CLARK.

Witnesses:
   JOHN C. EDWARDS,
   AUGUSTA E. DEAN.